(12) United States Patent
Zysman et al.

(10) Patent No.: US 9,644,535 B2
(45) Date of Patent: *May 9, 2017

(54) PASSIVE BOUNDARY LAYER BLEED SYSTEM FOR NACELLE INLET AIRFLOW CONTROL

(71) Applicant: United Technologies Corporation, Hartford, CT (US)

(72) Inventors: Steven H. Zysman, Amston, CT (US); Wesley K. Lord, South Glastonbury, CT (US); Robert M. Miller, Bloomfield, CT (US); Oliver V. Atassi, Longmeadow, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 318 days.

This patent is subject to a terminal disclaimer.

(21) Appl. No.: 14/325,583

(22) Filed: Jul. 8, 2014

(65) Prior Publication Data

US 2014/0321970 A1     Oct. 30, 2014

Related U.S. Application Data

(63) Continuation of application No. 12/446,786, filed as application No. PCT/US2006/039797 on Oct. 12, 2006, now Pat. No. 8,844,553.

(51) Int. Cl.
*F02C 7/04* (2006.01)
*F02C 7/045* (2006.01)
*B64D 33/02* (2006.01)

(52) U.S. Cl.
CPC ............... *F02C 7/04* (2013.01); *B64D 33/02* (2013.01); *F02C 7/045* (2013.01);
(Continued)

(58) Field of Classification Search
CPC .. F02C 7/04; F02C 7/042; F02C 7/045; F02C 6/08; B64D 2033/0226; F05D 2250/71; F05D 2270/17
See application file for complete search history.

(56) References Cited

U.S. PATENT DOCUMENTS 3,054,255 A   9/1962   Stratford
3,446,223 A   5/1969   Hancock
(Continued)

FOREIGN PATENT DOCUMENTS

DE   19720069   10/1997
FR   779655     4/1935
(Continued)

OTHER PUBLICATIONS

International Search Report and the Written Opinion dated PCT/US2006/039797 May 6, 2009.
(Continued)

*Primary Examiner* — Andrew Nguyen
(74) *Attorney, Agent, or Firm* — Carlson, Gaskey & Olds, P.C.

(57) ABSTRACT

A nacelle for a gas turbine engine system includes a housing that has a pressure side and a suction side. A passage extends between the pressure side and the suction side for permitting airflow from the pressure side to the suction side. The passage includes a first curved section that has an inlet at the pressure side. A linear section is connected with the first curved section. A second curved section is connected with the linear section and has an outlet at the suction side. The outlet has a cross sectional area smaller than a cross sectional area of the linear section.

18 Claims, 2 Drawing Sheets

(52) U.S. Cl.
CPC ............... *B64D 2033/0226* (2013.01); *F05D 2250/324* (2013.01); *F05D 2250/71* (2013.01); *F05D 2270/17* (2013.01); *Y10T 137/0536* (2015.04)

(56) References Cited

U.S. PATENT DOCUMENTS

| | | | |
|---|---|---|---|
| 3,618,876 A | | 11/1971 | Skidmore et al. |
| 3,664,612 A | * | 5/1972 | Skidmore ............. B64D 33/02 137/15.1 |
| 3,915,413 A | * | 10/1975 | Sargisson ............. B64D 33/02 137/15.2 |
| 4,132,240 A | | 1/1979 | Frantz |
| 4,379,191 A | | 4/1983 | Beggs et al. |
| 4,504,030 A | * | 3/1985 | Kniat ................. H05K 7/20136 244/117 A |
| 4,749,150 A | * | 6/1988 | Rose ...................... B64C 21/06 181/214 |
| 4,791,782 A | * | 12/1988 | Seed ........................ F01P 7/02 137/601.17 |
| 5,137,230 A | | 8/1992 | Coffinberry |
| 5,145,126 A | | 9/1992 | Patilla |
| 5,177,957 A | | 1/1993 | Grieb |
| 5,269,135 A | * | 12/1993 | Vermejan ................. F02C 7/04 60/226.1 |
| 5,743,488 A | * | 4/1998 | Rolston ................ B64C 21/025 181/214 |
| 5,934,611 A | * | 8/1999 | Tindell ................. B64C 21/025 181/214 |
| 6,050,527 A | | 4/2000 | Hebert et al. |
| 6,058,696 A | | 5/2000 | Nikkanen et al. |
| 6,851,255 B2 | | 2/2005 | Aitchison et al. |
| 2006/0059919 A1 | * | 3/2006 | Leachman ............. F23L 15/00 60/772 |
| 2006/0117734 A1 | | 6/2006 | Larkin et al. |
| 2006/0123796 A1 | | 6/2006 | Aycock et al. |

FOREIGN PATENT DOCUMENTS

| | | |
|---|---|---|
| GB | 1228806 | 4/1971 |
| GB | 2205903 | 12/1988 |
| GB | 2232132 | 5/1990 |

OTHER PUBLICATIONS

International Preliminary Report on Patentability dated May 22, 2009.

* cited by examiner

PASSIVE BOUNDARY LAYER BLEED SYSTEM FOR NACELLE INLET AIRFLOW CONTROL

RELATED APPLICATION

This application is a continuation of U.S. national phase application, Ser. No. 12/446,786, which was filed Apr. 23, 2009, which claims priority to PCT/US2006/039797, which was filed Oct. 12, 2006.

BACKGROUND OF THE INVENTION

This invention relates to gas turbine engines and, more particularly, to a passive bleed system for reducing drag on a gas turbine propulsion system.

Gas turbine engines are widely known and used for power generation and vehicle (e.g., aircraft) propulsion. There is a general trend to improve fuel efficiency of gas turbine engines. One technique for achieving better fuel efficiency is to reduce drag. For example, during flight, friction between airflow and the engine or other related components such as a nacelle produces drag that results in greater fuel consumption. Depending on a variety of different factors, the airflow can be laminar or turbulent. Laminar airflow generally produces less friction than turbulent airflow. Therefore, laminar airflow is desirable for reducing drag and improving fuel efficiency.

Presently, there are certain designs having an external shape that naturally produce laminar airflow over a certain portion of the nacelle. However, for these designs, the laminar airflow occurs under specific conditions, such as at cruise, and is subject to turbulent airflow under other conditions such as take-off and fan windmill conditions. Furthermore, debris carried within the airflow that has impacted and contaminated the smooth nacelle surface can cause a transition from laminar airflow to turbulent airflow. For example, insects that have impacted the nacelle leading edge can cause flow to transition from laminar to turbulent. Therefore, these nacelle designs are subject to the disadvantage of greater drag once the airflow changes to turbulent. Thus, there is a need for a system capable of controlling the airflow to change from turbulent airflow to laminar airflow.

SUMMARY OF THE INVENTION

In one exemplary embodiment, a nacelle for a gas turbine engine system includes a housing that has a pressure side and a suction side. A passage extends between the pressure side and the suction side for permitting airflow from the pressure side to the suction side. The passage includes a first curved section that has an inlet at the pressure side. A linear section is connected with the first curved section. A second curved section is connected with the linear section and has an outlet at the suction side. The outlet has a cross sectional area smaller than a cross sectional area of the linear section.

In a further embodiment of the above, the passage is configured for passively drawing turbulent airflow into the nacelle. The pressure side is located radially outward from the suction side and the passage is located upstream of a fan.

In a further embodiment of any of the above, the passage includes a section that has a progressively increasing cross-sectional area.

In a further embodiment of any of the above, the section extends between a passage inlet at the pressure side and the linear section of the passage.

In a further embodiment of any of the above, the section includes a first cross-sectional area at the passage inlet and a second cross-sectional area at the linear section that is about 2.5 times greater than the first cross-sectional area.

In a further embodiment of any of the above, the passage includes a first curved section that has a progressively increasing cross-sectional area.

In a further embodiment of any of the above, the housing includes an airflow surface and the passage includes an inlet that extends through the airflow surface. The airflow surface has a first section forward of the inlet relative to a direction of the airflow and a second section aft of the inlet. The first section defines a tangential plane wherein the second section is spaced apart from the tangential plane.

In a further embodiment of any of the above, the second section is spaced an offset distance in response to a thickness of an expected turbulent boundary layer.

In a further embodiment of any of the above, the second section is spaced an offset distance of about 0.25 inches from the tangential plane.

In a further embodiment of any of the above, the second section defines a scoop configured to direct airflow into the passage.

In a further embodiment of any of the above, the housing includes an airflow surface that has a section where airflow transitions from a first airflow that is generally laminar to a second airflow having a turbulent airflow component. The passage extends from the airflow surface aft of the section.

In another exemplary embodiment, a gas turbine engine system includes a fan for air intake and a nacelle that extends about the fan. The nacelle has a forward section that includes an outside airflow surface and an inside airflow surface relative to the fan. A passage is located upstream of a fan and extends between an inlet on the outside airflow surface and an outlet on the inside airflow surface. A first curved section extends from the inlet. A linear section is connected with the first curved section. A second curved section is connected with the linear section. The outlet includes a cross sectional area smaller than a cross sectional area of the linear section.

In a further embodiment of the above, the passage is configured to permit airflow from the outside airflow surface toward the inside airflow surface and is configured for passively drawing turbulent airflow into the nacelle.

In a further embodiment of any of the above, the passage includes a section that has a progressively increasing cross-sectional area. The section extends between a passage inlet at the outside airflow surface and the linear section of the passage.

In a further embodiment of any of the above, the section includes a first cross-sectional area at the passage inlet and a second cross-sectional area at the linear section that is about 2.5 times greater than the first cross-sectional area.

In a further embodiment of any of the above, the passage includes an inlet that extends through the outside airflow surface. The outside airflow surface includes a first section forward of the inlet relative to an airflow direction over the outside airflow surface and a second section aft of the inlet. The first section defines a tangential plane wherein the second section is spaced apart from the tangential plane.

In another exemplary embodiment, a method of controlling a turbulent airflow over an airflow surface of a nacelle includes diverting at least a portion of the turbulent airflow from the airflow surface into a continuous passage located upstream of a fan. The passage includes a first curved section that extends from an inlet. A linear section is connected with the first curved section. A second curved section is connected with the linear section. An outlet has a cross sectional area smaller than a cross sectional area of the linear section.

In a further embodiment of the above, the passage extends between the inlet on a radially outer side of the nacelle and the outlet on a radially inner side of the nacelle to produce a generally laminar airflow over the airflow surface.

In a further embodiment of any of the above, the method includes producing a pressure differential between a passage inlet at the airflow surface and a passage outlet to urge the turbulent airflow into the passage.

In a further embodiment of any of the above, the method includes diffusing the turbulent airflow to reduce a speed of the turbulent airflow within the passage.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
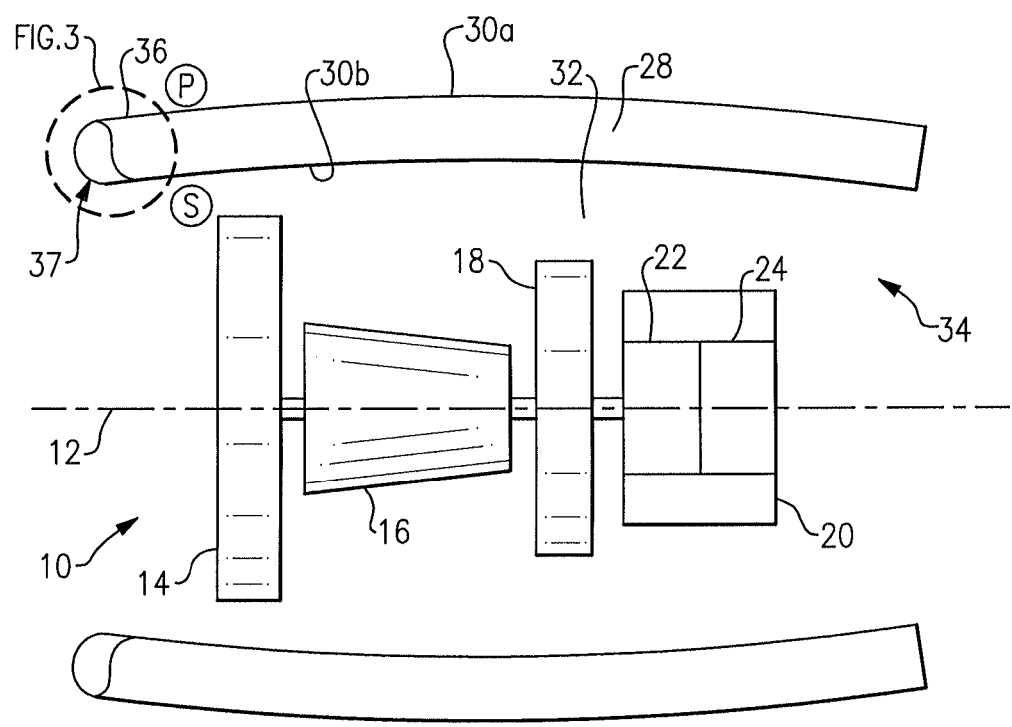
FIG. 1 illustrates selected portions of an example gas turbine engine system.

FIG. 1 illustrates a simplified view of selected portions of an example gas turbine engine 10, such as a gas turbine used for propulsion, circumferentially disposed about an engine centerline, or axial centerline axis 12. FIG. 1 is a schematic representation, for illustrative purposes only, and is not a limitation on the current invention. The gas turbine engine 10 includes a fan 14, a compressor 16, a combustion section 18, and a turbine section 20. As is well known in the art, air compressed in the compressor 16 is mixed with fuel that is burned in the combustion section 18 and expanded in turbine section 20. The air compressed in the compressor and the fuel mixture expanded in the turbine section 20 can both be referred to as a hot gas stream flow. The turbine section 20 includes rotors 22 and 24 that, in response to the expansion, rotate to drive the fan 14 and compressor 16.

A nacelle 28 (e.g., an outer housing or cowling) extends circumferentially about the gas turbine engine 10. In this example, the nacelle 28 includes an outside airflow surface 30a and an inside airflow surface 30b. A fan bypass passage 32 extends between the nacelle 28 and the gas turbine engine 10. In operation, the fan 14 draws air through an inlet lip 37 of the nacelle 28 into the bypass passage 32 and discharges the bypassed air out of a rear exhaust 34. The suction of the fan 14 in combination with the shape of the inlet lip 37 produces a suction side S at the inside airflow surface 30b relative to a pressure side P at the outside airflow surface 30a. A bleed passage 36 extends through the nacelle 28.

Figure 2:
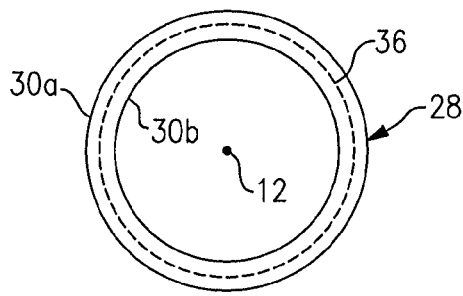
FIG. 2 illustrates an axial view of selected portions of the gas turbine engine system.

In the disclosed example, the bleed passage 36 extends circumferentially entirely about the nacelle 28, as shown schematically in the axial view of FIG. 2. In other examples, the bleed passage 36 extends only partially about the circumference. The bleed passage 36 may also include ribs or supports that extend through for structurally supporting the front portion of the nacelle relative to the aft portion. As will be described below, the bleed passage 36 provides the benefit of reducing drag on the nacelle 28 to thereby improve fuel efficiency. An additional benefit is reduced inlet distortion at low airspeed, high aircraft angle of attack.

Figure 3:
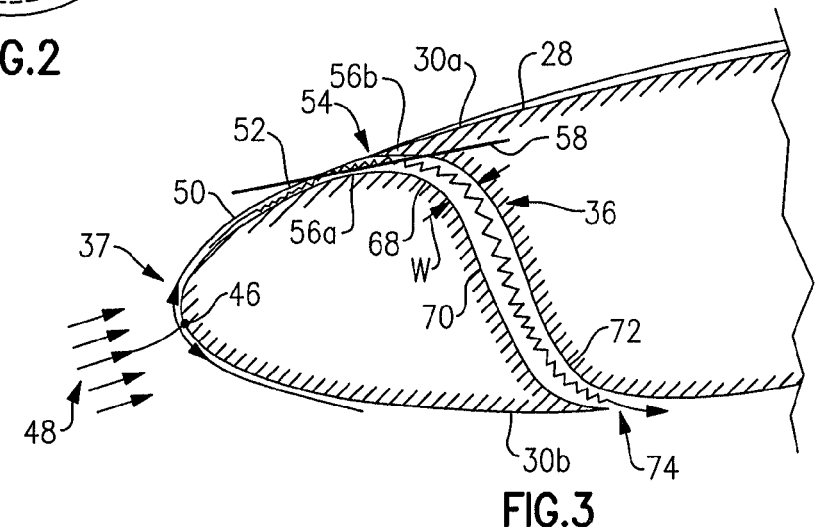
FIG. 3 illustrates a bleed passage through a section of a nacelle that extends about the gas turbine engine shown in FIG. 1.

FIG. 3 illustrates the portion of a nacelle 28 and bleed passage 36 according to the section shown in FIG. 1. In the illustrated example, the nacelle 28 includes a stagnation point 46 that intercepts an airflow 48 during, for example, high-speed cruise flight of the gas turbine engine 10. From the stagnation point 46, a portion of the airflow 48 flows over the outside airflow surface 30a and another portion of the airflow 48 flows over the inside airflow surface 30b.

In this example, the airflow 48 over the outside airflow surface 30a is initially laminar. However, as the airflow continues to flow over the airflow surface 30a, it encounters a section 50 on the nacelle 28 beyond which the airflow is turbulent. The terms "laminar" and "turbulent" as used in this description refer to a threshold of airflow vibration below which the airflow is laminar and above which the airflow is turbulent. In the disclosed example, the section 50 is where the airflow ceases to accelerate over the curved inlet lip, which is a condition that causes transition from laminar airflow to turbulent airflow 52. In other examples, there are other causes of the turbulent airflow 52, such as roughness of the normally smooth outside airflow surface 30a caused by debris, or airflow distortion from a high angle of attack.

The turbulent airflow 52 flows over the outside airflow surface 30a until it encounters an inlet 54 of the bleed passage 36. In this example, the inlet 54 includes a first section 56a forward of the inlet 54 and a second section 56b aft of the inlet 54. The first section 56a, which is part of the outside airflow surface 30a, defines an imaginary tangential plane 58. The second section 56b is offset from the tangential plane 58 to provide a scoop that diverts at least a portion of the turbulent airflow 52 into the bleed passage 36. The offset of the scoop enables recovery of the ram pressure of the external air flow at the inlet of the bleed passage, increasing pressure differential that drives the flow through the passage. In one example, the second section 56b is offset a distance (as measured from a direction 90° relative to the tangential plane 58) of about 0.25 inches from the tangential plane 58. This provides the benefit of enough scoop height to divert a significant portion of, or in some examples all of, the turbulent boundary layer airflow 52 into the bleed passage 36. In other examples, the height of the offset may be greater than or less than in the disclosed example, depending upon the thickness of an expected turbulent boundary layer over the outside airflow surface 30a.

Downstream of the inlet 54 a new boundary layer forms over the outside airflow surface 30a and is laminar. For example, the shape of the nacelle 28 downstream of the inlet 54 is designed for a desired change in air pressure per unit distance from the outside airflow surface 30a (i.e., pressure profile) to maintain laminar airflow downstream of the inlet 54. In one example, the favorable pressure profile is achieved by designing the outside airflow surface 30a of the nacelle 28 with a desired curvature. Given this description, one of ordinary skill in the art will be able to recognize desirable nacelle 28 shapes to meet their particular needs. Downstream of the inlet 54, surface contamination is less likely to occur as this region does not project into the free stream.

In the illustrated example, the bleed passage 36 includes a first curved section 68, a linear section 70, and a second curved section 72 having an outlet 74 for discharging the turbulent airflow 52 into the bypass passage 32. In the illustrated example, the outlet 74 is located forward of the fan 14 to exploit the pressure differential between the outside airflow surface 30a and an inside airflow surface 30b to draw the turbulent airflow 52 into the inlet 54. The pressure differential provides a passive system for drawing the turbulent airflow 52 into the bleed passage 36 without a need for a separate or additional component to draw in the turbulent airflow 52.

In the disclosed example, the first curved section 68 extends between the inlet 54 and the beginning of the linear section 70 and includes a cross-sectional width W that progressively increases between the inlet 54 and the beginning of the linear section 70. This provides the benefit of diffusing the turbulent bleed airflow 52 as it flows through the bleed passage 36. That is, the first curved section 68 reduces the flow speed of the bleed airflow 52 such that the bleed airflow 52 can turn through the first curved section 68 and the second curved section 72 without significant pressure loss within the bleed passage 36. High pressure loss within the bleed passage is inefficient and would limit the bleed flow, effectively acting as a restriction in the passage.

In one example, the cross-sectional area of the first curved section 68 at the inlet 54 is about 2.5 times smaller than the cross-sectional area at the beginning of the linear section 70. In this example, the ratio of about 2.5 provides a desirable diffusion of bleed airflow 52 to reduce pressure loss within the bleed passage 36. That is, if the ratio slows the bleed airflow 52 too much, a relatively greater pressure loss occurs because the increased diffusion will cause flow separation. Likewise, if the ratio slows the bleed airflow 52 too little, a relatively greater pressure loss occurs because the bleed airflow 52 will be traveling too fast which increases friction. At the bleed flow discharge 74 the passage area is decreased, thus forming a nozzle. Given this description, one of ordinary skill in the art will recognize other area ratios or other sections having area ratios that are suited to meet their particular needs.

As can be appreciated in the disclosed example, the bleed passage 36 gradually curves through the first curved section 68 and the second curved section 72. Such gradual curves, rather than relatively sharp curves (e.g., corners or 90° curves), provide the benefit of efficient airflow 52 through the bleed passage 36 without significant pressure loss.

The disclosed examples provide the benefit of changing turbulent airflow 52 over the nacelle 28 to laminar airflow to reduce drag on the gas turbine nacelle 28 and thereby increase fuel efficiency. In one example, drag on the nacelle 28 is expected to be reduced by about ⅓ through use of the bleed passage 36. In certain examples, the discharge of the turbulent airflow 52 into the bypass passage 32 results in a nominally lower airflow pressure into the gas fan 14, which generally penalizes fuel efficiency. However, the net gain in fuel efficiency from reduced drag on the nacelle 28 is expected to be more significant than the net loss of fuel efficiency from lower airflow inlet pressure into the gas turbine engine 10. Thus, in many examples, an overall fuel efficiency gain is expected.

Figure 4:
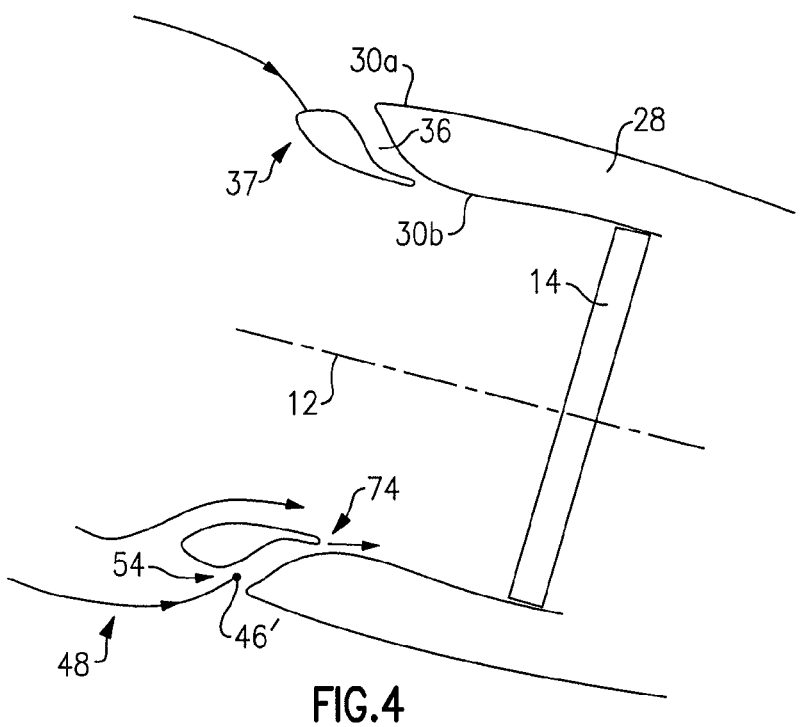
FIG. 4 illustrates another example of the gas turbine engine in a low flight velocity, high angle of attack, and high engine power condition.

The example above refers to the operation of the bleed passage 36 at a cruise condition for which the external streamline direction and stagnation point 46 are generally as illustrated on FIG. 3, and the flow through the bleed passage 36 is fairly uniform around the circumference. In another example illustrated in FIG. 4, the gas turbine engine 10 is shown in a low flight velocity, high angle of attack, and high engine power condition. In this condition, the stagnation point 46' on the lower part of the inlet lip 37 is located aft on the outside airflow 30a surface, and there is a threat of flow separation at the lower part of the inside airflow surface 30b due to the extreme incidence and turning at the lower part of the inlet lip 37 of. The stagnation point 46' at the lower part of the inlet lip 37 is now approximately aligned with the inlet 54 of the bleed passage 36, creating a strong flow through the bleed passage 36 at the inlet lip 37. The bleed flow injection at the inside airflow surface 30b provides the benefit of energizing the internal flow into the fan 14, thus avoiding internal flow separation at the inlet lip 37.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A nacelle for a gas turbine engine system, comprising:
a housing having a pressure side and a suction side, the pressure side is located radially outward from the suction side; and
a passage extending between the pressure side and the suction side for permitting airflow from the pressure side to the suction side and the passage includes a first curved section having an inlet at the pressure side, a linear section connected with the first curved section, and a second curved section connected with the linear section and having an outlet at the suction side, the outlet having a cross sectional area smaller than a cross sectional area of the linear section, wherein the passage is configured for passively drawing turbulent airflow into the nacelle.

2. The nacelle as recited in claim 1, wherein the passage includes a section having a progressively increasing cross-sectional area.

3. The nacelle as recited in claim 2, wherein the first curved section extends between a passage inlet at the pressure side and the linear section of the passage.

4. The nacelle as recited in claim 3, wherein the first curved section includes a first cross-sectional area at the passage inlet and a second cross-sectional area at the linear section that is about 2.5 times greater than the first cross-sectional area.

5. The nacelle as recited in claim 1, wherein the first curved section includes a progressively increasing cross-sectional area.

6. The nacelle as recited in claim 1, wherein the housing includes an airflow surface and the passage includes the inlet that extends through the airflow surface, the airflow surface having a first section forward of the inlet relative to a direction of the airflow and a second section aft of the inlet, the first section defining a tangential plane wherein the second section is spaced apart from the tangential plane.

7. The nacelle as recited in claim 6, wherein the second section is spaced an offset distance from the tangential plane depending on a thickness of an expected turbulent boundary layer.

8. The nacelle as recited in claim 6, wherein the second section is spaced an offset distance of about 0.25 inches from the tangential plane.

9. The nacelle as recited in claim 6, wherein the second section defines a scoop configured to direct airflow into the passage.

10. The nacelle as recited in claim 1, wherein the housing includes an airflow surface having a transition section where airflow transitions from a first airflow that is generally laminar to a second airflow having a turbulent airflow component, wherein the passage extends from the airflow surface aft of the transition section.

11. A gas turbine engine system comprising:
a fan for air intake;
a nacelle that extends about the fan, the nacelle having a forward section that includes an outside airflow surface and an inside airflow surface relative to the fan; and
a passage located upstream of the fan extending between an inlet on the outside airflow surface and an outlet on the inside airflow surface, a first curved section extends from the inlet, a linear section connected with the first curved section, a second curved section connected with the linear section, the outlet includes a cross sectional area smaller than a cross sectional area of the linear section, wherein the passage is configured for passively drawing turbulent airflow into the nacelle.

12. The system as recited in claim 11, wherein the passage is configured to permit airflow from the outside airflow surface toward the inside airflow surface and is configured for passively drawing turbulent airflow into the nacelle.

13. The system as recited in claim 11, wherein the first curved section includes a progressively increasing cross-sectional area, the first curved section extends between the passage inlet at the outside airflow surface and the linear section of the passage.

14. The system as recited in claim 13, wherein the first curved section includes a first cross-sectional area at the passage inlet and a second cross-sectional area at the linear section that is about 2.5 times greater than the first cross-sectional area.

15. The system as recited in claim 11, wherein the passage includes the inlet that extends through the outside airflow surface, the outside airflow surface including a first section forward of the inlet relative to an airflow direction over the outside airflow surface and a second section aft of the inlet, the first section defining a tangential plane wherein the second section is spaced apart from the tangential plane.

16. A method of controlling a turbulent airflow over an airflow surface of a nacelle, comprising:
diverting at least a portion of the turbulent airflow from the airflow surface into a continuous passage located upstream of a fan, the passage includes a first curved section extending from an inlet, a linear section connected with the first curved section, and a second curved section connected with the linear section, and an outlet, wherein the passage extends between the inlet on a radially outer side of the nacelle and the outlet on a radially inner side of the nacelle, wherein the outlet has a cross sectional area smaller than a cross sectional area of the linear section.

17. The method as recited in claim 16, further including producing a pressure differential between a passage inlet at the airflow surface and a passage outlet to urge the turbulent airflow into the passage.

18. The method as recited in claim 16, further including diffusing the turbulent airflow to reduce a speed of the turbulent airflow within the passage.

* * * * *